Feb. 2, 1932.　　　　K. DAVIS　　　　1,843,211
FLEXIBLE SHAFT COUPLING
Filed June 23, 1930　　　2 Sheets-Sheet 1
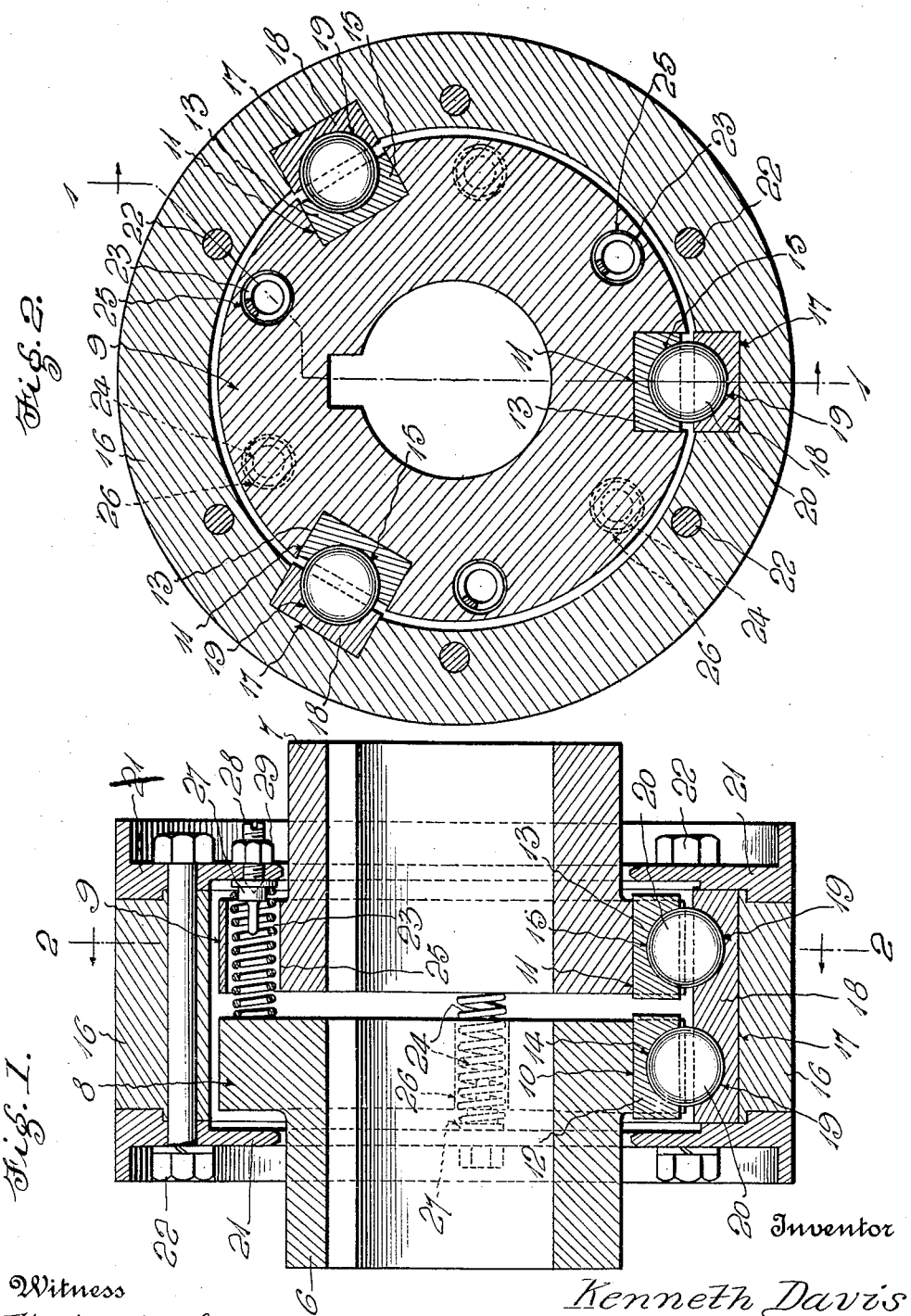
Inventor
Kenneth Davis Feb. 2, 1932. K. DAVIS 1,843,211
FLEXIBLE SHAFT COUPLING
Filed June 23, 1930 2 Sheets-Sheet 2
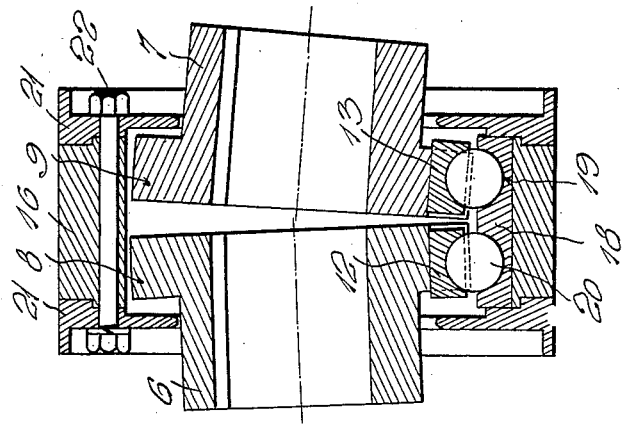
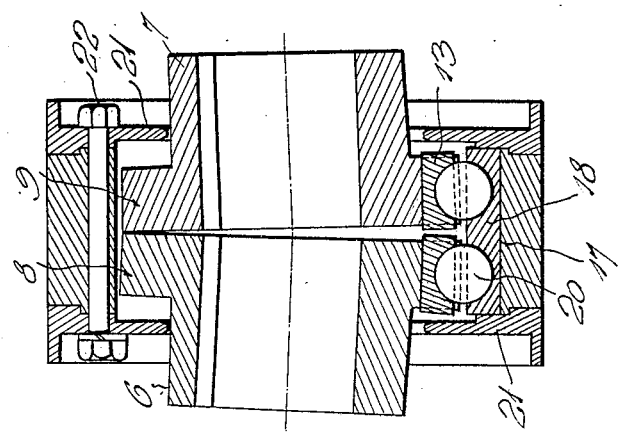
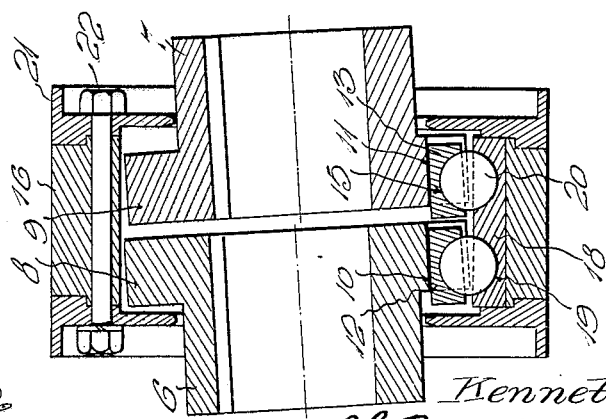
Inventor
Kenneth Davis Patented Feb. 2, 1932

1,843,211

UNITED STATES PATENT OFFICE

KENNETH DAVIS, OF PITTSBURGH, PENNSYLVANIA, ASSIGNOR TO PENN MACHINE COMPANY, OF JOHNSTOWN, PENNSYLVANIA, A CORPORATION OF PENNSYLVANIA

FLEXIBLE SHAFT COUPLING

Application filed June 23, 1930. Serial No. 463,210.

The invention aims to provide an exceptionally simple and inexpensive, yet an efficient, noiseless and long-lived coupling for connecting two shafts with each other and for driving one from the other even though said shafts may have offset misalignment, angular misalignment, or both, and a further object is to provide for amply strong, uniform-area, driving connections between the shafts, regardless of the constantly varying relative positions of coupling parts when in use.

With the foregoing in view, the invention resides in the novel subject matter hereinafter described and claimed, description being accomplished by reference to the accompanying drawings.

Fig. 1 is a longitudinal section on line 1—1 of Fig. 2.

Fig. 2 is a transverse section on line 2—2 of Fig. 1.

Figs. 3, 4 and 5 are diagrams showing the manner in which the coupling compensates for offset misalignment, angular misalignment, and both, respectively.

The preferred construction has been illustrated and will be specifically described, with the understanding that within the scope of the invention as claimed, variations may be made.

The numerals 6 and 7 denote two hubs disposed end to end and adapted for keying upon two separate shafts, the inner ends of said hubs being provided with peripheral rims 8 and 9 respectively. These rims are provided with transverse, alined, flat-sided grooves 10 and 11 respectively which are spaced apart circumferentially thereof, rectangular blocks 12 being snugly received in the grooves 10 and similar blocks 13 snugly received in the grooves 11, all of said blocks however being adapted to slide transversely of the rims 8 and 9 (longitudinally of the coupling) to a limited extent. The outer sides of the blocks 12 and 13 are each provided with a concave socket of substantially hemispherical form, the sockets of the blocks 12 being denoted at 14 and those of the blocks 13 being shown at 15.

A ring 16 surrounds the rims 8 and 9 and is spaced outwardly from said rims to a slight extent, the inner periphery of this ring 16 being provided with a plurality of transverse, flat-sided grooves 17, each of which is disposed opposite two of the alined grooves 10 and 11. Outer, relatively long blocks 18 are snugly received in the grooves 17, the inner side of each of said blocks 18 being provided near its ends with two concave sockets 19 of substantially hemispherical form. Balls 20 are jointly received in the sockets 14, 15 and 19. The balls, sockets, blocks and grooves, establish constant, uniform-area driving connections between the hubs 6 and 7 and the ring 16 in all relative positions of parts, and these driving connections are sufficiently strong to meet the requirements of any industry.

Two side rings 21 are secured by bolts or the like 22 to the opposite edges of the ring 16, said rings 21 projecting inwardly from said ring 16 in contact with the ends of the blocks 18. These rings however are spaced sufficiently from the blocks 12 and 13 to allow sliding of the latter during operation of the coupling, should the shafts have offset misalignment (Fig. 3), angular misalignment (Fig. 4), or both (Fig. 5).

To insure smooth and silent operation, I prefer to provide circumferentially spaced compression springs 23 and 24. The springs 23 pass through openings 25 in the rim 9 and at their inner ends abut the inner side of the rim 8. The springs 24 pass through similar openings 26 in rim 8 and at their inner ends abut the inner side of rim 9. The outer ends of the springs 23 and 24 react against the rings 21 and they thus exert a force tending to move the two hubs 6 and 7 longitudinally away from each other. The hubs cannot of course move under the influence of the springs when keyed to shafts and the pressure exerted by the springs then absorbs shocks and causes smooth and silent operation of the coupling.

The outer ends of the springs 23 and 24 preferably receive and abut shoulders on metal plugs 27. These plugs are socketed to engage the pointed inner ends of adjusting screws 28 threaded through the rings 21, said screws having nuts 29 for locking them after adjustment. These screws may be adjusted to obtain the best results and then locked.

It will be seen from the foregoing that I have provided a simple and quite flexible coupling which at all times maintains a predetermined pressure area for transmitting power regardless of misalignment of shafts. Moreover, the coupling is such that when constructed in proper sizes, it will transmit any practical amount of power required by any industry.

Attention is again invited to the fact that variations may be made within the scope of the invention as claimed.

I claim:—

1. A flexible shaft coupling comprising two hubs disposed end to end, a ring surrounding said hubs and free of rigid anchorage to both thereof, and universally movable pivotal connecting means between said ring and both hubs embodying blocks slidable longitudinally of the coupling, said connecting means allowing various misalignments of said hubs and constantly maintaining uniform-area driving connections between said hubs and ring whether said hubs be aligned, be in offset misalignment, be in angular misalignment, or be in both offset and angular misalignment.

2. A flexible shaft coupling comprising two hubs disposed end to end, a ring around said hubs and free of rigid anchorage to both thereof, and ball and socket connecting means between both hubs and said ring embodying blocks slidable longitudinally of the coupling, said connecting means allowing various misalignments of said hubs and constantly maintaining uniform-area driving connections between said hubs and ring whether said hubs be aligned, be in offset misalignment, be in angular misalignment, or be in both offset and angular misalignment.

3. A flexible shaft coupling comprising two hubs disposed end to end, two series of blocks spaced circumferentially about said hubs respectively, said blocks and hubs having coacting faces mounting the blocks for sliding in directions parallel to the hub axes, said coacting faces maintaining constant uniform-area contact with each other in all relative positions of blocks and hubs, the outer sides of said blocks having substantially hemispherical sockets, balls snugly seated in said sockets and projecting beyond the blocks, and a ring surrounding said hubs, blocks and balls, said ring having substantially hemispherical sockets snugly receiving the projecting outer portions of said balls.

4. A flexible shaft coupling comprising two hubs disposed end to end and each having a plurality of circumferentially spaced grooves in its periphery, blocks snugly yet slidably received in said grooves respectively, each block and its receiving groove having flat co-acting faces extending longitudinally of the hub in which the groove is formed and adapted to maintain constant uniform-area contact in all relative positions of block and groove, the peripheral sides of said blocks being formed with substantially hemispherical sockets, balls resting snugly in said sockets, and a ring surrounding said hubs, the inner side of said ring having substantially hemispherical sockets snugly receiving the outer portions of said balls.

5. A flexible shaft coupling comprising two hubs disposed end to end, inner blocks spaced around and carried by said hubs respectively, the outer sides of said blocks having substantially hemispherical sockets, balls snugly seated in and projecting beyond said sockets, outer blocks having substantially hemispherical sockets in their inner sides snugly receiving the projecting outer portions of said balls, a ring around and carrying said outer blocks; said blocks, balls, hubs and ring having constant uniform-area contact in any relative positions of parts; certain of said blocks being mounted for sliding longitudinally of the coupling.

6. A flexible shaft coupling comprising two hubs disposed end to end and each having peripheral flat-sided grooves spaced apart circumferentially thereof, the grooves of one hub being aligned with those of the other, inner blocks snugly received one in each of said grooves and adapted to slide longitudinally of the coupling, a ring surrounding said hubs and having relatively long grooves in its inner periphery unidirectional with said aligned grooves, each of said long grooves being opposed to two of said aligned grooves, relatively long outer blocks received one in each of said long grooves, each of said long blocks having two concave sockets near the ends of its inner side and each of the first named blocks being provided with one similar socket in its outer side, and balls jointly received in the sockets of the inner and outer blocks, said grooves, blocks and balls constantly maintaining uniform-area driving connections between said hubs and ring in all relative positions of parts.

7. A flexible shaft coupling comprising two hubs disposed end to end and each having a peripheral rim, the two rims being provided with tranverse aligned peripheral grooves spaced apart circumferentially thereof, inner blocks snugly received one in each of said grooves and adapted to slide transversely of said rims, a ring surrounding said rims and having transverse relatively long grooves in its inner periphery, each of these grooves being opposed to two of the aforesaid alined grooves, relatively long outer blocks received one in each of said relatively long grooves, each of said relatively long blocks having two concave sockets near the ends of its inner side and each of the first named blocks being provided with one similar socket in its outer side, balls jointly received in the sockets of the inner and outer blocks, and two side rings secured to the first named ring and projecting inwardly therefrom in contact with the ends of said long blocks and in spaced relation with said rims, said grooves, blocks, sockets and balls constantly maintaining uniform-area driving connections between said hubs and ring in all relative positions of parts.

8. A structure as specified in claim 1; together with spring means spaced apart circumferentially of the coupling, said spring means acting in opposite directions on said ring, in one direction on one of said hubs and in the other direction on the other of said hubs, all of said directions extending longitudinally of the coupling.

9. A flexible shaft coupling comprising two hubs disposed end to end and each having a peripheral rim at its inner end, said rims being provided with circumferentially spaced openings out of alignment with each other, a ring surrounding said rims, two side rings secured to the first named ring and projecting inwardly therefrom into opposed spaced relation with the remote sides of said rims, coiled compression springs received in the aforesaid openings of said rims and at their outer ends re-acting against said side rings, the inner ends of said springs bearing against the adjacent inner sides of said rims, and ball and socket connecting means between said rims and the first named ring, embodying portions slidable longitudinally of the coupling.

10. A flexible shaft coupling comprising two hubs arranged end to end, a ring member surrounding said hubs and spaced outwardly therefrom, and a flexible connection between said ring member and said hubs comprising balls and slidable blocks having sockets in which said balls are engaged, said flexible connection maintaining uniform area driving connection between the hubs and the ring in the presence of either angular or parallel misalignment.

In testimony whereof I affix my signature.
KENNETH DAVIS.